(12) United States Patent
Schantz et al.

(10) Patent No.: US 9,703,419 B2
(45) Date of Patent: Jul. 11, 2017

(54) PRESENTING INDICATION OF INPUT TO A TOUCH-ENABLED PAD ON TOUCH-ENABLED PAD

(71) Applicant: Lenovo (Singapore) Pte. Ltd., New Tech Park (SG)

(72) Inventors: Daniel Jordan Schantz, Raleigh, NC (US); Wesley Abram Luttrell, Raleigh, NC (US); Christopher Miles Osborne, Cary, NC (US); Vincent Charles Conzola, Raleigh, NC (US)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 0 days.

(21) Appl. No.: 14/994,324

(22) Filed: Jan. 13, 2016

(65) Prior Publication Data

US 2016/0124572 A1    May 5, 2016

Related U.S. Application Data

(63) Continuation of application No. 14/198,961, filed on Mar. 6, 2014, now Pat. No. 9,310,960.

(51) Int. Cl.

| | |
|---|---|
| *G06F 3/041* | (2006.01) |
| *G06F 3/0354* | (2013.01) |
| *G06F 3/0481* | (2013.01) |
| *G06F 3/0488* | (2013.01) |
| *G06F 3/038* | (2013.01) |
| *G06F 3/02* | (2006.01) |
| *G06F 3/0484* | (2013.01) |
| *G06K 9/00* | (2006.01) |
| *G06K 9/22* | (2006.01) |

(52) U.S. Cl.
CPC ......... *G06F 3/0416* (2013.01); *G06F 3/0227* (2013.01); *G06F 3/038* (2013.01); *G06F 3/03545* (2013.01); *G06F 3/03547* (2013.01); *G06F 3/0412* (2013.01); *G06F 3/0488* (2013.01); *G06F 3/04812* (2013.01); *G06F 3/04842* (2013.01); *G06F 3/04883* (2013.01); *G06F 3/04886* (2013.01); *G06K 9/00402* (2013.01); *G06K 9/222* (2013.01); *G06F 2203/04808* (2013.01)

(58) Field of Classification Search
CPC .............. G06F 3/0227; G06F 3/03545; G06F 3/03547; G06F 3/0412; G06F 3/0416; G06F 3/04812; G06F 3/04842; G06F 3/0488; G06F 3/04883; G06K 9/00402; G06K 9/222

See application file for complete search history.

(56) References Cited

U.S. PATENT DOCUMENTS

| | | | |
|---|---|---|---|
| 7,663,607 B2 * | 2/2010 | Hotelling | G06F 3/0416 178/18.01 |
| 2003/0142855 A1 * | 7/2003 | Kuo | G07C 9/00047 382/119 |

(Continued)

*Primary Examiner* — Viet Pham
(74) *Attorney, Agent, or Firm* — John L. Rogitz; John M. Rogitz

(57) ABSTRACT

In one aspect, an apparatus includes a housing, a touch-enabled pad coupled to the housing, a processor, and a memory accessible to the processor. The memory bears instructions executable by the processor to receive input to the touch-enabled pad and to present an indication of the input on the touch-enabled pad.

20 Claims, 6 Drawing Sheets

(56) References Cited

U.S. PATENT DOCUMENTS

| | | | |
|---|---|---|---|
| 2005/0162398 A1* | 7/2005 | Eliasson | G06F 3/03545 345/173 |
| 2007/0152977 A1* | 7/2007 | Ng | G06F 3/03547 345/173 |
| 2007/0152985 A1* | 7/2007 | Ostergaard | G06F 3/0421 345/176 |
| 2008/0284925 A1* | 11/2008 | Han | G06F 3/0425 349/12 |
| 2010/0302185 A1* | 12/2010 | Han | G06F 3/042 345/173 |
| 2010/0302210 A1* | 12/2010 | Han | G06F 3/0412 345/175 |
| 2012/0206364 A1* | 8/2012 | Ciesla | G06F 3/04886 345/168 |
| 2014/0125598 A1* | 5/2014 | Cheng | G06F 3/017 345/173 |
| 2014/0267078 A1* | 9/2014 | Kukulski | G06F 3/0416 345/173 |

* cited by examiner

PRESENTING INDICATION OF INPUT TO A TOUCH-ENABLED PAD ON TOUCH-ENABLED PAD

I. FIELD

The present application relates generally to presenting an indication of input to a touch-enabled pad on a touch-enabled pad.

II. BACKGROUND

When providing input to a device, it is desirable to ascertain, that the input has been provided as intended. Moreover, it is desirable that it not be cumbersome to ascertain that the input has been provided as intended. Currently, touch-enabled pads do not provide a way to ascertain that input to them has been provided as intended.

SUMMARY

In one aspect, an apparatus includes a housing, a touch-enabled pad coupled to the housing, a processor, and a memory accessible to the processor. The memory bears instructions executable by the processor to receive input to the touch-enabled pad, and present an indication of the input on the touch-enabled pad for a threshold time.

In another aspect, a method includes receiving input at a touch-enabled pad, and presenting a representation of at least a portion of the input on the touch-enabled pad.

In still another aspect, an apparatus includes a housing, a touch-enabled pad coupled to the housing, a processor, and a memory accessible to the processor. The memory bears instructions executable by fee processor to receive a signal from the touch-enabled pad indicative of input to the touch-enabled pad, and present an representation of the input on the touch-enabled pad.

The details of present principles, both as to their structure and operation, can best be understood in reference to the accompanying drawings, in which like reference numerals refer to like parts, and in which:

DETAILED DESCRIPTION

Figure 1:
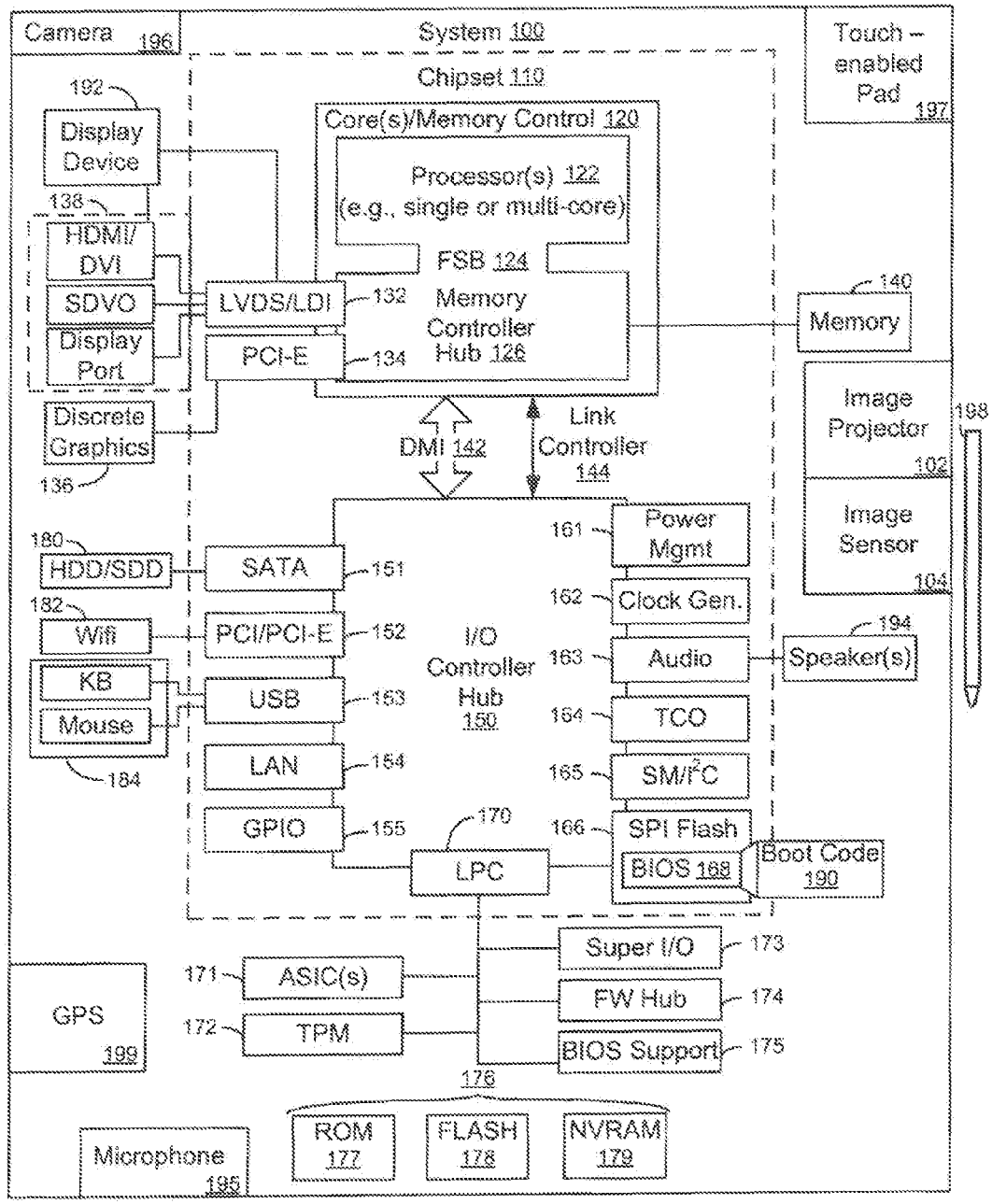
FIG. 1 is a block diagram of an example system in accordance with present principles.

This disclosure relates generally to device-based information. With respect to any computer systems discussed herein, a system may include server and client components, connected over a network such that data may be exchanged between the client, and server components. The client components may include one or more computing devices including televisions (e.g. smart TVs, Internet-enabled TVs), computers such as desktops, laptops and tablet computers, so-called convertible devices (e.g. having a tablet configuration and laptop configuration), and other mobile devices including smart phones. These client devices may employ, as non-limiting examples, operating systems from Apple, Google, or Microsoft. A Unix operating system may be used. These operating systems can execute one or more browsers such as a browser made by Microsoft or Google or Mozilla or other browser program that can access web applications hosted by the Internet servers over a network such as the Internet, a local, intranet, or a virtual private network.

As used herds, instructions refer to computer-implemented steps for processing information in fee system. Instructions can be implemented in software, firmware or hardware; hence, illustrative components, blocks, modules, circuits, and steps are set forth in terms of their functionality.

A processor may be any conventional general purpose single- or multi-chip processor that can execute logic by means of various lines such as address lines, data lines, and control lines and registers and shift registers. Moreover, any logical blocks, modules, and circuits described herein can be implemented or performed, in addition to a general purpose processor, in or by a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor cars be implemented by a controller or state machine or a combination of computing devices.

Any software and/or applications described by way of flow charts and/or user interfaces herein can include various sub-routines, procedures, etc. It is to be understood that logic divulged as being executed by e.g. a module can be redistributed to other software modules and/or combined together in a single module and/or made available in a shareable library.

Logic when implemented in software, can be written in an appropriate language such as hut not limited to C# or C++, and can be stored on or transmitted through, a computer-readable storage medium (e.g. that may not be a carrier wave) such as a random access memory (RAM), read-only memory (ROM), electrically erasable programmable read-only memory (EEPROM), compact disk read-only memory (CD-ROM) or other optical, disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and twisted pair wires. Such connections may include wireless communication connections including infrared and radio.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the dates through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

"A system having one or more of A, B, and C" (likewise "a system having one or more of A, B, or C" and "a system having one or more of A, B, C") includes systems that have A alone, B alone, C alone, A and B together, A and C together, B and C together, and/or A, B, and C together, etc.

The term "circuit" or "circuitry" is used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Now specifically in reference to FIG. 1, it shows an example block diagram of an information handling system and/or computer system 100 such as e.g. an Internet enabled, computerized, telephone (e.g. a smart phone), a tablet computer, a notebook or desktop computer, an Internet enabled computerized wearable device such as a smart watch, a Computerized television (TV) such as a smart TV, etc. Thus, in some embodiments the system 100 may be a desktop computer system, such as one of the ThinkCentre® or ThinkPad® series of personal computers sold by Lenovo (US) Inc. of Morrisville, N.C., or a workstation computer, such as the ThinkStation®, which, are sold by Lenovo (US) Inc. of Morrisviile, N.C.; however, as apparent from the description herein, a client device, a server or other machine in accordance with present principles may include other features or only some of the features of the system 100.

As shown in FIG. 1, the system 100 includes a so-called chipset 110. A chipset refers to a group of integrated circuits, or chips, that are designed to work together. Chipsets are usually marketed as a single product (e.g., consider chipsets marketed under the brands INTEL®, AMD®, etc).

In the example of FIG. 1, the chipset 110 has a particular architecture, which may vary to some extent depending on brand or manufacturer. The architecture of the chipset 110 includes a core and memory control group 120 and an I/O controller hub 150 that exchange information, (e.g., data, signals, commands, etc.) via, for example, a direct management interface or direct media interface (DMI) 142 or a link controller 144. Is the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the conventional "northbridge" style architecture.

The memory controller hub 126 interfaces with memory 140. For example, the memory controller hub 126 may provide support for DDR SDRAM memory (e.g., DDR, DDR2, DDR3, etc,). In general, the memory 140 is a type of random-access memory (RAM). It is often referred to as "system memory."

The memory controller hub 126 further includes a low-voltage differential signaling interface (LVDS) 132. The LVDS 132 may be a so-called LVDS Display Interface (LDI) for support of a display device 192 (e.g., a CRT, a flat panel, a projector, a touch-enabled display, etc.). A block 138 includes some examples of technologies that may be supported via the LVDS interface 132 (e.g., serial digital video, HDMI/DVI, display port). The memory controller hub 126 also includes one or more PCI-express interlaces (PCI-E) 134, for example, for support of discrete graphics 136. Discrete graphics using a PCI-E interlace has become an alternative approach to an accelerated graphics port (AGP). For example, the memory controller hub 126 may include a 16-lane (x16) PCI-E port for an external PCI-E-based graphics card (including e.g. one of more GPUs). An example system may include AGP or PCI-E for support of graphics.

The I/O hub controller 150 includes a variety of interfaces. The example of FIG. 1 includes a SATA interface 151, one or more PCI-E interfaces 152 (optionally one or more legacy PCI interfaces), one or more USB interfaces 153, a LAN interface 154 (more generally a network interface for communication over at least one network such as fee Internet, a WAN, a LAN, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165 and a serial peripheral flash memory/controller interface (SPI Flash) 166 which, in the example of FIG. 1, includes BIOS 168 and boot code 190. With respect to network connections, the I/O hub controller 150 may include integrated gigabit Ethernet controller lines multiplexed with a PCI-E interface port. Other network features may operate independent, of a PCI-E interface.

The interfaces of the I/O hub controller 150 provide for communication with various devices, networks, etc. for example, the SATA interface 151 provides for reading, writing or reading and writing information on one or more drives 180 such as HDDs, SDDs or a combination thereof, but in any case fee drives 180 are understood to be e.g. tangible computer readable storage mediums that may not be carrier waves. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such, as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174. BIOS support 175 as wed as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

In addition to the foregoing, the system 100 is understood to include an audio receiver/microphone 195 in communication with the processor 122 and providing input thereto based on e.g. a user providing audible input to the microphone 195. A camera 196 is also shown, which is in communication with and provides input to the processor 122. The camera 196 may be, e.g., a thermal imaging camera, a digital camera such as a webcam, and/or a camera integrated into the system 100 and controllable by the processor 122 to gather pictures/images and/or video.

Further, the system 100 includes a touch-enabled pad 197 (e.g. a "touchpad") configured to assume at least a non-discrete configuration and e.g. plural discrete configurations in accordance with present principles. It is to be understood that in example embodiments, the touch-enabled pad 197 may not include a touch-enabled "display" on any portion thereof. For instance, in some example embodiments, the touch-enabled pad 197 is a pad configured to receive input thereat and to present indications and/or representations of the input in accordance with present principles, but nonetheless does not include on any portion thereof e.g. a cathode ray tube display, a light-emitting diode display, a plasma display, a liquid crystal display, or an organic fight-emitting diode display. In such embodiments, e.g. indications and/or representations in accordance with present principles may be presented as non-permanent indentations in the surface of the touch-enabled pad 197 by manipulating e.g. a pressure-sensitive film or gel material on at least a portion of the surface area (e.g., encased in a top-most portion of fee pad 197 relative to the surface of the pad 197) of the touch-enabled pad 197. However, it is to be understood that in other embodiments a combination of pressure sensitive material and e.g. either or both of a transformative material (e.g. a haptic actuator and/or haptic element) on fee pad 197 manipulable by the processor 122, and/or LED or LCD display on a portion of the touch-enabled pad 197 and e.g. underneath the material, may be used to present an (e.g. layered) indication and/or representation in accordance with present principles.

Further describing the touch-enabled pad 197, it is to be understood that it is configured to receive input from, a user (e.g. based on a user touching and/or manipulating the touch-enabled pad 197), and also is configured to receive input from an input device 198 such as e.g. a (e.g. electronic and/or stylus) pen configured to provide input to the pad 197 at least when in contact therewith and/or as manipulated by a user.

Still in reference to FIG. 1, note that a GPS transceiver 199 is also shown that is configured to e.g. receive geographic position information from at least one satellite and provide the information to the processor 122. However, it is to be understood that, another suitable position receiver other man a OPS receiver may be used in accordance with, present principles to e.g. determine the location of the system 100.

Figure 2:
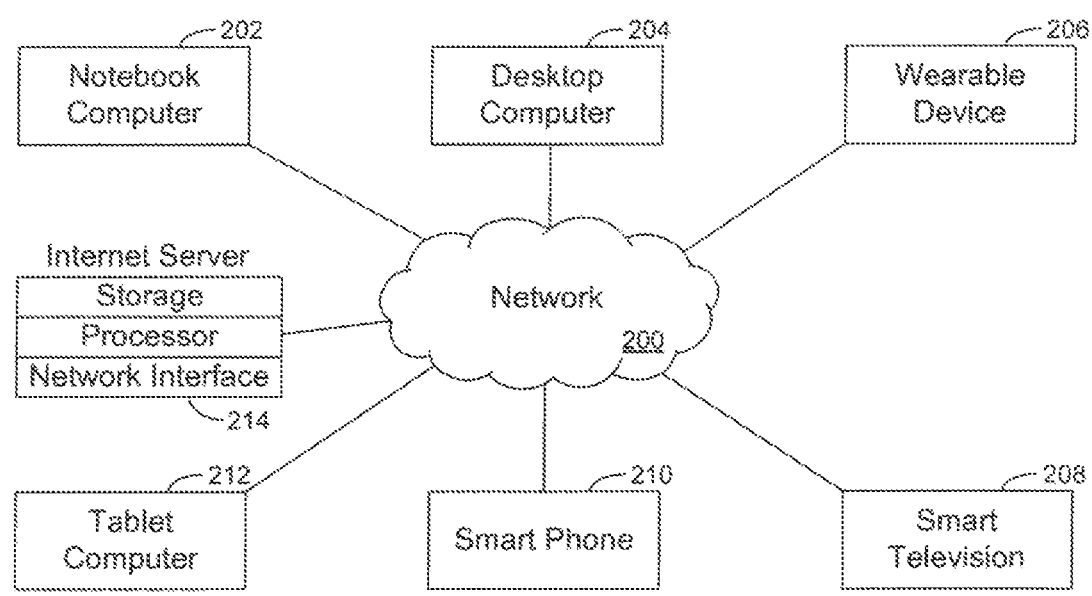
FIG. 2 is a block diagram of a network of devices in accordance with present principles.

Before moving on to FIG. 2, it is to be understood that an example client device of other machine/computer may include fewer or more features than shown on the system 100 of FIG. 1. In any case, it is to be understood at least based on the foregoing that the system 100 is configured to undertake present principles.

Turning now to FIG. 2, it shows example devices communicating over a network 200 such as e.g. the Internet in accordance with present principles is shown. It is to be understood that e.g. each of the devices described in reference to FIG. 2 may include at least some of the features, components, and/or elements of the system 100 described above. In any case, FIG. 2 shows a notebook computer 202, a desktop computer 204, a wearable device 206 such as e.g., a smart watch, a smart television (TV) 208, a smart phone 2120, a tablet computer 212, and a server 214 in accordance with present principles such as e.g. an Internet server that may e.g. provide cloud storage accessible to the devices 202-212. It is to be understood that the devices 202-214 are configured to communicate with each other over the network 200 to undertake present principles.

Figure 3:
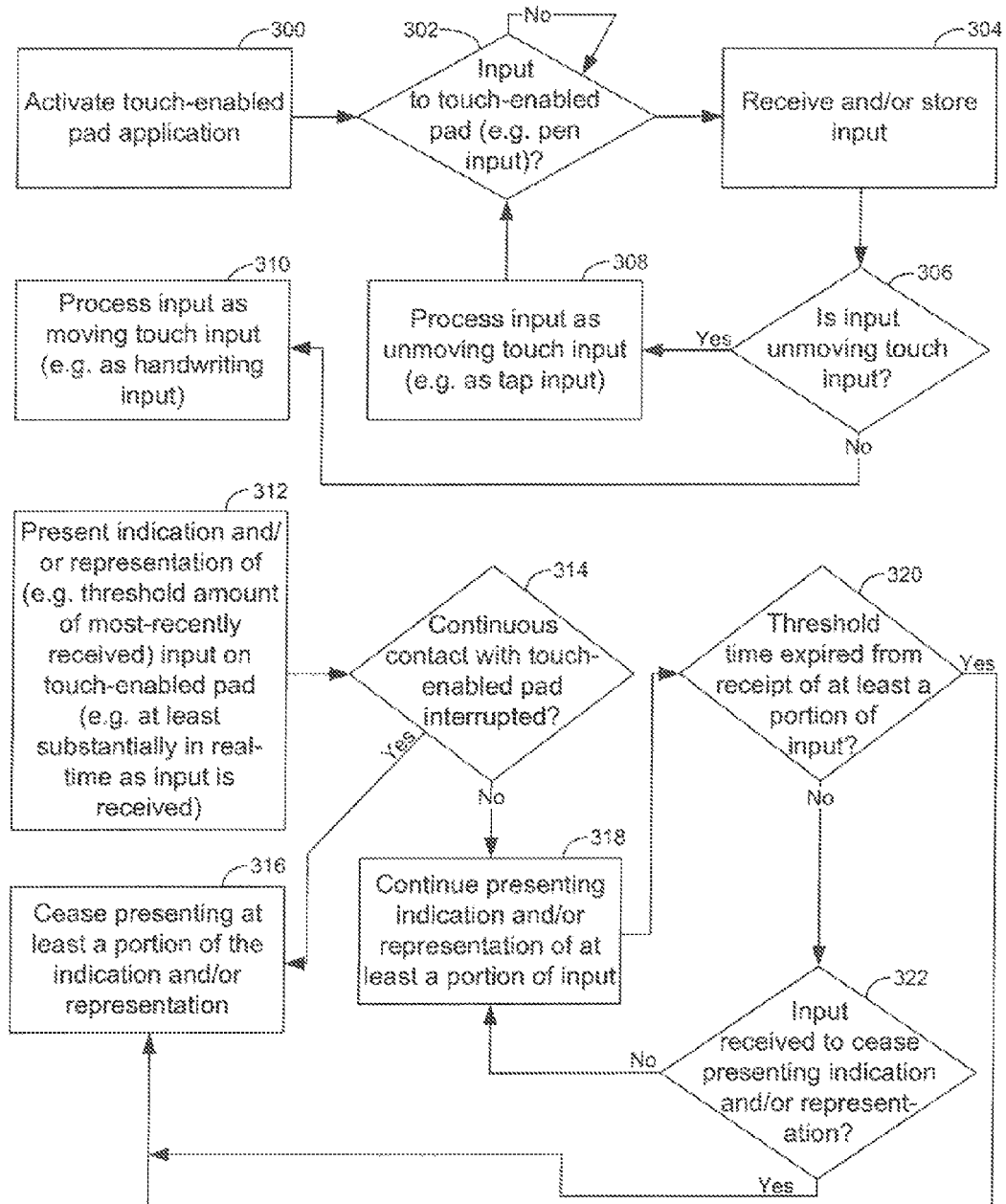
FIG. 3 is a flow chart of example logic according to present principles.

Referring to FIG. 3, it shows example logic that may be undertaken by a device such as the system 100 in accordance with present principles. Beginning at block 300, the logic, may activate and/or initiate a touch-enabled pad application for receiving input from and/or controlling a touch-enabled pad, as may be done e.g. at startup of the device undertaking the logic of FIG. 3 (mentioned below in reference to FIG. 3 simply as "the device"). The logic then proceeds to decision diamond 302 where the logic determines whether input to the touch-enabled pad has been received (e.g. based on capacitive-based sensing, conductance-based sensing, etc.), such as e.g. input from a pen being manipulated by a user. A negative determination at diamond 302 causes the logic to continue snaking the determination at diamond 302 until such time as an affirmative determination is made. Once an affirmative determination is made, the logic proceeds from diamond 302 to block 304. At block 304, the logic receives and/or stores input that has been provided to the touch-enabled pad and/or received by the processor of the device from the touch-enabled pad.

The logic then proceeds from block 304 to decision diamond 306. At diamond 306, the logic determines whether the input to the touch-enabled pad is unmoving touch input (e.g. a tap, and/or single finger press to the touch-enabled pad without movement of the finger e.g. along an x-y plane established by (e.g., coplanar with) and/or parallel to a plane established by e.g. the exposed surface of the touch-enabled pad). An affirmative determination at diamond 306 causes the logic to move to block 308, where the logic processes the input as unmoving touch input (e.g. by processing the input as a left click selection of an item or icon on which a cursor presented on a display of the device is hovering). However, a negative determination at diamond 306 instead causes the logic to proceed to block 310, at which the logic processes the input as moving touch input such as e.g. processing the input as handwriting input in accordance with present principles.

After block 310, the logic proceeds to block 312 where the logic presents an indication and/or representation of the (e.g. moving) input on the touch-enabled, pad in accordance with present principles. In example embodiments, the indication and/or representation may be e.g. a representation on the touch-enabled pad of the input itself, such as a tracing thereof corresponding to the location(s) at which the input was provided to the touch-enabled pad.

Furthermore, in some embodiments only a threshold amount of the indication and/or representation may be presented on the touch-enabled pad such, that e.g. only a most-recently received threshold amount (e.g. a predetermined number of characters if the input is handwriting as determined using handwriting (e.g. determination and/or identification) software) of input is represented on the touch-enabled pad and e.g. relatively less-recently received portions of the input are not represented, and/or have been represented and have ceased being represented, etc. Also note that in some embodiments the indication and/or representation corresponding to the input feat is received may be presented e.g. at least substantially in real-time as the input is received so that e.g. the user has immediate "feedback" at the touch-enabled pad on the input he or she is providing if the touch-enabled pad.

In any case, from block 312 the logic proceeds to decision diamond 314. At diamond 314 the logic determines whether continuous contact of the portion of the person (e.g. finger) and/or input instrument (e.g. a stylus pen) in contact with the touch-enabled pad and/or providing input to the touch-enabled pad has ceased, been interrupted, etc. For instance, if a person begins providing input to the touch-enabled pad with a pen, and then, life the pen away from the touch-enabled pad, this may in some instances cause the logic to determine that continuous contact with the touch-enabled pad has ceased.

Regardless, an affirmative determination at diamond 314 causes the logic to proceed to block 316, where the logic may cease presenting at least a portion of the indication and/or representation (e.g. automatically without further user input responsive to the affirmative determination at diamond 314) in accordance with present principles, and/or may even in some instances cause e.g. any and/or ail indication and/or representation of the input to fade from presentation in accordance with present principles. Note, however, that a negative determination at diamond 314 instead causes the logic to proceed to block 318, at which the logic continues presenting the indication and/or representation of e.g. at least a portion of the input.

After block 318, the logic proceeds to decision diamond 320. At diamond 320, the logic determines whether a threshold time has expired from receipt of at least a portion of the input in accordance with present principles. The threshold time may be e.g. established by a user as discussed further below, and/or may be predetermined by the device's manufacturer and/or the provider of the touch-enabled pad application. An affirmative determination at diamond 320 causes the logic to proceed to block 316. However, a negative determination causes the logic to instead proceed to decision diamond 322.

At decision diamond 322, the logic determines whether input (e.g. front a user) has been received to cease presenting at least a portion of the indication and/or representation. An affirmative determination at diamond 322 causes the logic to proceed, to block 316, but a negative determination at diamond 322 causes the logic to proceed to block 318.

Figure 4:
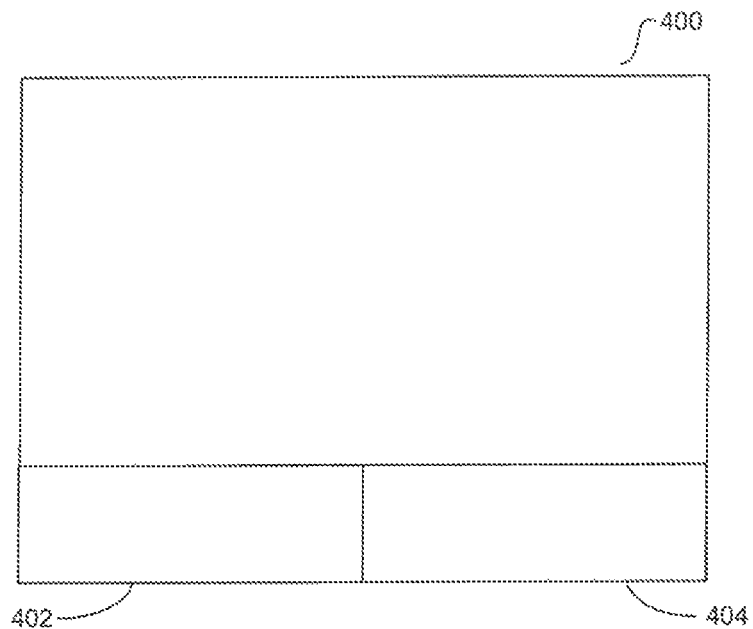
FIGS. 4 and 5 show an example of a touch-enabled pad undertaking present principles.

Continuing the detailed description in reference to FIG. 4, it shows an example of a touch-enabled pad 400 without any indications and/or representations of input in accordance with present principles presented thereon, it being noted that a left-click button 402 and a right-click button 404 are shown but in some embodiments the buttons 402 and 404 may be non-discrete in that they are e.g. flush with the rest of the pad.

Figure 5:
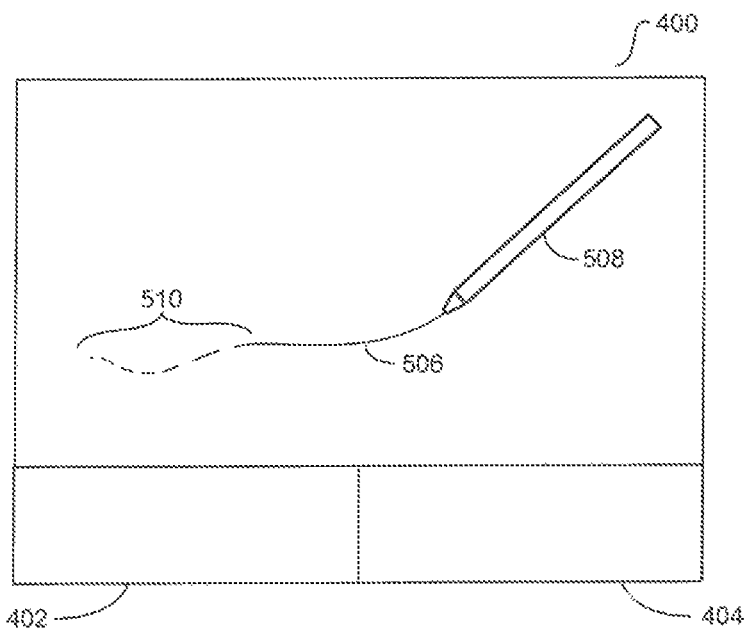

FIG. 5 shows an example of the touch-enabled pad 400 with the left-click button. 402 and right-click button 404. Note, however that a visual representation (e.g. a tracing) 506 of input from a pea 508 used to provide the input is shown. Note that e.g. the tracing 506 may be of handwriting input to the pad 400 from a user, and that the tracing 506 continues to be presented for e.g. at least a threshold time after the input was provided at pad locations to which the input was provided. Moreover, note that at least a portion 510 of the tracing 506 of less-recently received input has already began disappearing (and/or fading, and/or changing from being solid to being perforated as it disappears) from presentation (e.g. responsive to the time threshold expiring for e.g. the particular portion 510 but not subsequently input portions to the right of the portion 510 as shown). For instance, this may be the case e.g. when handwriting tracing corresponding to handwriting generally left to right as provided to the pad 400 as shown progressively ceases to be presented (e.g. progressively fades in the sequence the input was received) as time goes on and e.g. responsive to time thresholds expiring for respective portions of the input from the time at which the respective portions of input were provided.

Still in reference to FIG. 5 and as noted above, it is to be understood that the tracing 506 as presented on the touch-enabled pad 400 may be in the form of an indentation in the surface of the touch-enabled pad 400 that was formed e.g. by pressure from the pen 508 when in contact with the pad 400. Such an indentation may be formed using e.g. a pressure-sensitive film, liquid, and/or gel material encased in an upper portion of the pad 400 relative to the exposed surface of the pad such that the pad non-permanently (e.g. temporarily) indents in areas to which input to the pad 400 is directed and men e.g. dissipates responsive to a signal from a processor of die device to do so (e.g. such as responsive to a lapse of a threshold time and/or based on receipt of a user command to do so), based on the properties of the material used, and/or based on manipulation of a haptic element on the touch-enabled pad configurable in discrete configurations in accordance with present principles, etc. Furthermore, such material may be configured, to remain non-permanently indented in areas to which the input is directed subsequent to cessation of the input for at least a threshold time. What's more, the pad 400 may be configured for indented areas to assume a color and/or shade different from other areas of the pad 400 to which input is not directed e.g. in the input sequence causing presentation of the tracing 506, and furthermore the color(s) for the indentations may be determined by a user (e.g. by manipulating a settings III such as the UI 800 to be described below).

In any case, it is to be understood that in embodiments where the touch-enabled pad 400 presents the tracing 506 as an indentation, the indentation on die pad 400 is thus understood to be an example of a discrete configuration for the pad 400, in contrast to the non-discrete configuration for the pad 400 as shown in FIG. 4. Further, it is to be understood that the pad 400 assuming such a discrete configuration prevents at least some parallax issues from arising such as e.g. the user not being able to see the indication and/or representation from certain angles relative to the pad 400 owing to the discrete configuration eliminating these issues in at least some instances.

Figure 6:
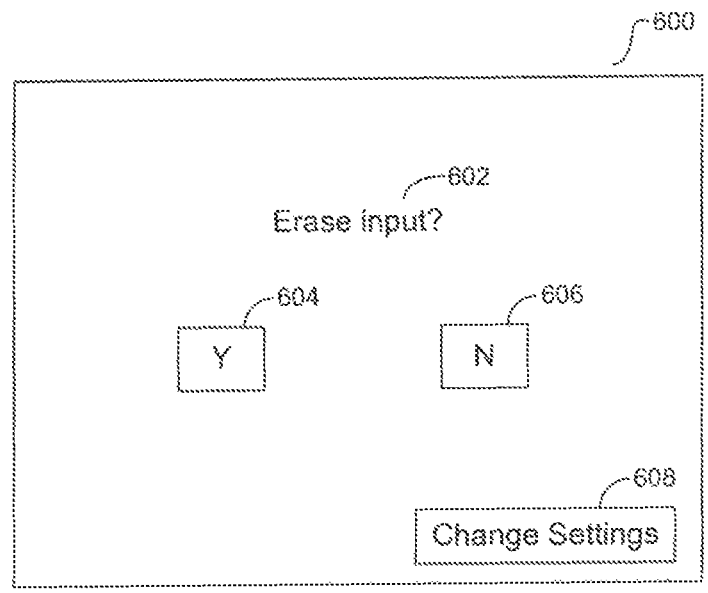
FIGS. 6-8 show example user interfaces (Ills) in accordance with present principles.

Now in reference to FIG. 6, it shows an example user interface (UI) 600 that may be presented on a display of a device undertaking present principles, such as e.g. a touch-enabled, display. The UI 600 includes a prompt 602 for a user to provide input for whether to the device is to cease presenting at least a portion of an indication and/or representation of input in accordance with present principles on a touch-enabled pad. Thus, a yes selector element 604 and a no selector element 606 are shown that are respectively selectable to e.g. automatically without further user input responsive thereto provide input to the device to cease presenting at least a portion of the indication and/or representation or to not do so. Also note that a change settings selector element 608 is shown that is selectable to automatically without further user input cause the settings UI 800 which will be described further below to be presented. However, note that in addition to or in lieu of the element 604, a physical button, may also be included e.g. on a portion of the housing of the device including the touch-enabled pad to automatically without, further user input responsive thereto provide input to the device to cease presenting at least a portion of the indication and/or representation.

Figure 7:
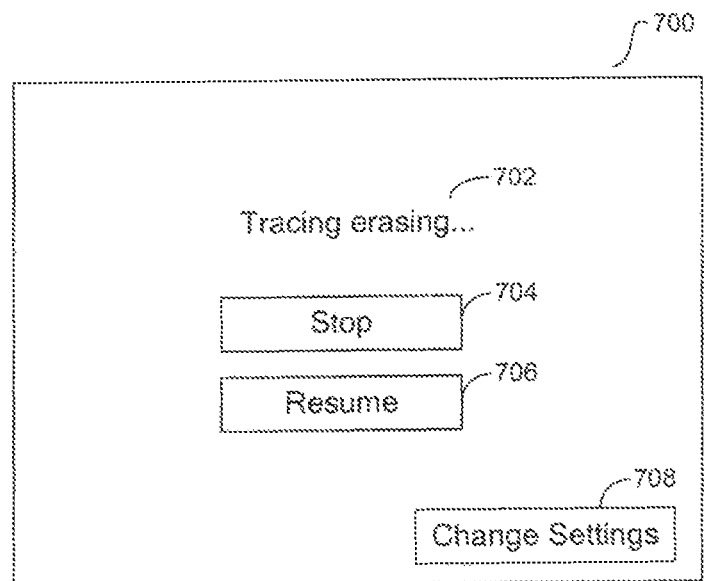

Moving on in reference to FIG. 7, it shows an example UI 700 that may be presented on a display of a device undertaking present principles, such as e.g. a touch-enabled display. The UI 700 includes an indication 702 that a tracing of input presented on a touch-enabled pad of the device in accordance wife present principles is being "erased" (e.g., is ceasing to be presented), as may be done e.g. automatically without user input responsive to expiration of a threshold time in accordance with present principles and/or when e.g. a user provides input to the device to cease presenting at least a portion of the tracing (e.g. by manipulating a UI such as by selecting selector element 604 as described above and/or by pressing a button protruding from a housing of the device). Accordingly, a stop selector element 704 is shown that is selectable to automatically without, further user input responsive thereto cause the device to stop "erasing" the tracing (e.g. to thus cause the device to continue presenting at least a portion of the tracing until such e.g. expiration of another threshold time and/or until a resume selector element 706 is selected to automatically without further user input responsive thereto cause the device to resume "erasing"). Also note that a change settings selector element 708 is shown that is selectable to automatically without further user input cause the settings UI 800 to be presented, which will be described immediately below.

Figure 8:
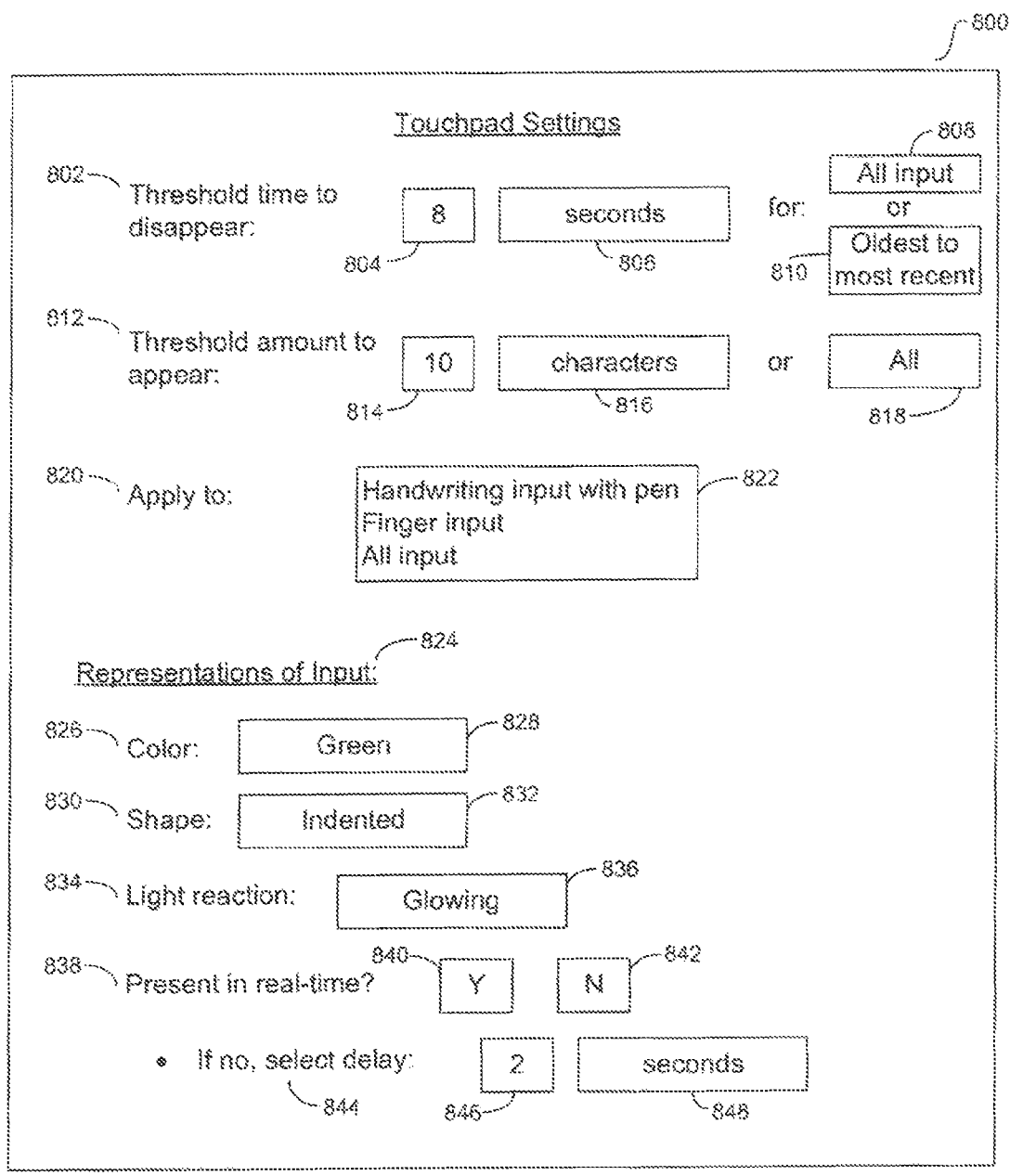

Accordingly, reference is now made to FIG. 8, which shows the settings UI 800. The settings UI. 800 includes a first setting 802 for a user to establish a time threshold for ceasing to present an indication and/or representation of input in accordance with present principles. Thus, an input box 804 for inputting a number is shown, along with a time increment, box 806 for establishing a time increment (e.g. milliseconds, seconds, minutes, hours, etc) corresponding to the number to thus establish the threshold (e.g. such as establishing it as eight seconds from receipt of the input as shown).

Note further that an all input selector element 808 is shown that is selectable to automatically without further user input responsive thereto configure the device to e.g. cease presenting the indication and/or representation of all input to the touch-enabled pad responsive to the threshold expiring (e.g. irrespective of the time a given portion of the input is received, the threshold being measured from the first of the input being received, and/or when the device begins receiving it, but in other embodiments being measured from the last of the input being received). Nonetheless, also note that an oldest to most recent selector element 810 is shown, that is selectable to automatically without further user input-responsive thereto configure the device to e.g. progressively cease presenting the indication and/or representation of input to the touch-enabled pad from oldest to most-recently received input responsive to thresholds progressively expiring for respective portions of the input-based on when the respective portions where provided from oldest to most-recent.

Still in reference to FIG. 8, a second setting 812 is shown for a user to establish a threshold amount of indication and/or representation e.g. to present at any given time on the touch-enabled pad in accordance with present principles such that e.g. only a most-recently received amount per the threshold amount is presented on the touch-enabled pad once input corresponding thereto is received. Thus, an input but 814 for inputting a number is shown, along with an amount increment box 816 for establishing an amount increment corresponding to the number to thus establish the threshold (e.g. such as establishing the setting at the most-recently received ten characters of the input as shown). Note that in addition to characters, other amount increments include but are not limited to e.g. words and sentences. Furthermore, an all selector element 818 is shown that is selectable to automatically without further user input responsive thereto configure the device to present all (e.g. continuous and/or uninterrupted) input that is received to be indicated and/or represented on the touch-enabled pad.

In addition to the foregoing, the settings UI 800 may also include a third setting 820 for establishing which, types and/or classes of input for which to present indications and/or representations in accordance with present principles (and/or e.g. for which, to apply the threshold time setting and/or threshold amount setting). Accordingly an input box 822 includes one or more types of inputs. In the example shown, the types include handwriting input using a pen, finger input, and all input received at the touch-enabled pad.

Also in addition to the foregoing, the settings UI 800 may include a section 824 for additional (e.g. appearance) settings associated with the indications and/or representations of input. For instance, a color setting 826 is shown along with a corresponding input box 828 manipulable to select a color(s) in which the indications and/or representations are to appear. A shape setting 830 is also shown with a corresponding input box 832 manipulable to select a shape(s) in which the indications and/or representations are to appear (e.g. as indentations in the touch-enabled pad in accordance with present principles, with rigid and/or straight edges, in various font styles such as e.g. Times New Roman or Cambria, etc.). What's more, a light reaction setting 834 is shown, along with a corresponding input box 836 manipulable to select one or more light reaction types for which to present the indications and/or representations (e.g., low contrast relative to the touch-enabled pad color in relatively bright lighting, high contrast relative to the touch-enabled pad color in relatively less bright lighting, as glow-in-the-dark, neon, and/or glowing lighting in relatively dark lighting, etc). Accordingly, note that light-reactive substances may also be used in accordance with present principles and/or juxtaposed on the touch-enabled pad to undertake present principles.

Still in reference to FIG. 8, beneath the setting 834 may be a setting 838 for whether indications and/or representations should be presented in real-time or at least substantially in real time (e.g. owing to input processing time, by the device). Thus, a yes selector element 840 is shown that is selectable to automatically without further user input responsive thereto configure the device to present indications and/or representations of input in real time, and a no selector element 842 is also shown that is selectable to automatically without further user input responsive thereto configure the device to not present indications and/or representations of input in real time (but instead, e.g., present it after a predetermined delay and/or lapse in time from receipt of the input such as may be determined by a user manipulating such a setting on a settings UI such as the UI 800, present it after continuous contact input has ceased altogether to thus show a "result" of the input provided after input has been provided (e.g. in its entirety) to the touch-enabled pad, etc.).

Accordingly, also note that a select delay setting 844 is shown for configuring a delay in presenting me indication and/or representation e.g. when, the no selector element 842 has been selected. Thus, an input box 846 for inputting a number is included on the UI 800, along with an increment box 848 for establishing a time increment (e.g. milliseconds, seconds, minutes, hours, etc.) corresponding to the number to thus establish the delay (e.g. such as establishing it as two seconds from receipt of the input as shown).

Without reference to any particular figure, it is to be understood that indications of input that are not e.g. representations of the input may include e.g. an indication that the input being received matches a previous e.g. handwriting signature of a user. E.g. the indication may indicate the word "matching, . . . " as in the handwriting as being input matches a handwriting signature recognized by the device.

Further without reference to any figure, it is to be understood that in addition to or in lieu of the composition of and/or materials included on a touch-enabled pad as described above, note that to undertake, present principles e.g. eInks and/or phosphorous-based inks may also be used.

Further still, present principles apply similarly to gesture-enabled pads, and/or pads that are both touch and gesture enabled, mutatis mutandis.

Present principles also recognize that portions of a touch-enabled pad presenting indications and/or representations in accordance with present principles may remain touch-enabled and/or touch-sensitive even, when presenting such indications and/or representations, as may portions of the touch-enabled pad not presenting indications and/or representations.

Additionally, note that in some embodiments input for which an indication and/or representation is provided need not be continuous input so long as e.g. breaks in input to the touch-enabled pad are received within a threshold break time.

Providing examples of use cases for present principles, e.g. providing a representation of handwriting input to a touch-enabled pad may be used in conjunction with e.g. the signing of electronic documents to provide handwriting input to the electronic document, secure log-ins (e.g. to a user account) using handwriting input, password identification number (PIN) verifications for online purchases and still other electronic password verifications (e.g. an Internet password), and/or password, replacement.

Present principles further recognize that although e.g. a software application for undertaking present principles may be vended with a device such as the system 100, it is to be understood that present principles apply in instances where such an application is e.g. downloaded from a server to a device over a network such as the Internet.

It may now be appreciated based on the foregoing that handwriting characteristics of a user may be "maintained" in at least some embodiments when presenting the indications and/or representations discussed herein to thus provide the user with an indication of the input he or she has provided to the touch-enabled pad, thus providing temporary visual cues for the handwriting input.

While the particular PRESENTING INDICATION OF INPUT TO A TOUCH-ENABLED PAD ON TOUCH-ENABLED PAD is herein shown and described in detail, it is to be understood that the subject matter which is encompassed by the present application is limited only by the claims.

What is claimed is:

1. An apparatus, comprising:
    a housing;
    a touch-enabled pad coupled to the housing;
    a processor; and
    storage accessible to the processor and bearing instructions executable by the processor to:
    receive input at the touch-enabled pad; and
    present, on the touch-enabled pad, a representation of at least a portion of the input, the representation of at least the portion of the input not being presented using one or more of: a cathode ray tube display, a light-emitting diode display, a plasma display, a liquid crystal display, an organic light-emitting diode display.

2. The apparatus of claim 1, wherein the instructions are executable by the processor to:
    present a representation of at least a most-recently received threshold amount of the input.

3. The apparatus of claim 1, wherein the instructions are executable by the processor to:
    present a representation of only a most-recently received threshold amount of the input.

4. The apparatus of claim 3, wherein the representation of only the most-recently received threshold amount of the input is less than an entirety of the input that is received.

5. The apparatus of claim 3, wherein the threshold amount is a predetermined number of characters.

6. The apparatus of claim 5, wherein the instructions are executable by the processor to:
    identify characters from the input using handwriting recognition software.

7. The apparatus of claim 1, comprising a button coupled to the housing that is selectable to transmit at least one signal to the processor, and wherein the instructions are executable by the processor to:
    in response to selection of the button, cease presenting the representation of the input.

8. The apparatus of claim 1, wherein the touch-enabled pad comprises a light-reactive substance, and wherein the instructions are executable by the processor to:
    present the representation using the light-reactive substance.

9. The apparatus of claim 8, wherein the light-reactive substance is a glow-in-the-dark substance.

10. The apparatus of claim 1, wherein the instructions are executable by the processor to:
    determine whether the input is generated based on contact, with the touch-enabled pad, of a body part or an inanimate object;
    present the representation responsive to a determination that the input is generated using a body part; and
    decline to present the representation responsive to a determination that the input is generated using an inanimate object.

11. The apparatus of claim 1, wherein the instructions are executable by the processor to:
    determine whether the input is generated based on contact, with the touch-enabled pad, of a body part or an inanimate object;
    present the representation responsive to a determination that the input is generated using an inanimate object; and
    decline to present the representation responsive to a determination that the input is generated using a body part.

12. The apparatus of claim 1, comprising a display coupled to the housing, and wherein the instructions are executable by the processor to:
    present a selector on the display that is selectable to command the apparatus to cease presenting the representation of the input.

13. A method, comprising:
    receiving input at a touch-enabled pad mechanism; and
    presenting, on the touch-enabled pad mechanism and using a device on which the touch-enabled pad mechanism is disposed, an indication of at least a portion of the input, the indication of at least the portion of the input not being presented using a cathode ray tube display, a light-emitting diode display, a plasma display, a liquid crystal display, or an organic light-emitting diode display.

14. The method of claim 13, comprising:
presenting the indication responsive to cessation of receipt of the input.

15. The method of claim 13, comprising:
presenting the indication in at least a first color selected by a user via a user interface presented on a display, the first color being different from a second color of an exterior surface of the touch-enabled pad.

16. The method of claim 13, wherein the touch-enabled pad mechanism comprises a light-reactive substance, and wherein the method comprises:
presenting the indication using the light-reactive substance.

17. The method of claim 13, comprising:
presenting a selector on a display that is selectable to command the touch-enabled pad mechanism to cease presenting the indication.

18. An apparatus, comprising:
a housing;
a touch-enabled pad coupled to the housing;
a processor; and
storage accessible to the processor and bearing instructions executable by the processor to:
receive input at the touch-enabled pad; and
present, on the touch-enabled pad, at least one indication pertaining to at least a portion of the input, the at least one indication not being presented using one or more of: a cathode ray tube display, a light-emitting diode display, a plasma display, a liquid crystal display, an organic light-emitting diode display.

19. The apparatus of claim 18, wherein the at least one indication comprises an indication that the received input matches a predefined handwriting signature.

20. The apparatus of claim 18, wherein the instructions are executable by the processor to:
present the indication in response to expiration of a threshold time from when receipt of the input ceases.

* * * * *